Dec. 13, 1960  H. O. TRIPPENSEE ET AL  2,963,798
PLANETARIUM
Filed May 22, 1958  3 Sheets-Sheet 1

INVENTORS
HERBERT O. TRIPPENSEE
REUBEN E. TRIPPENSEE
BY
ATTORNEYS

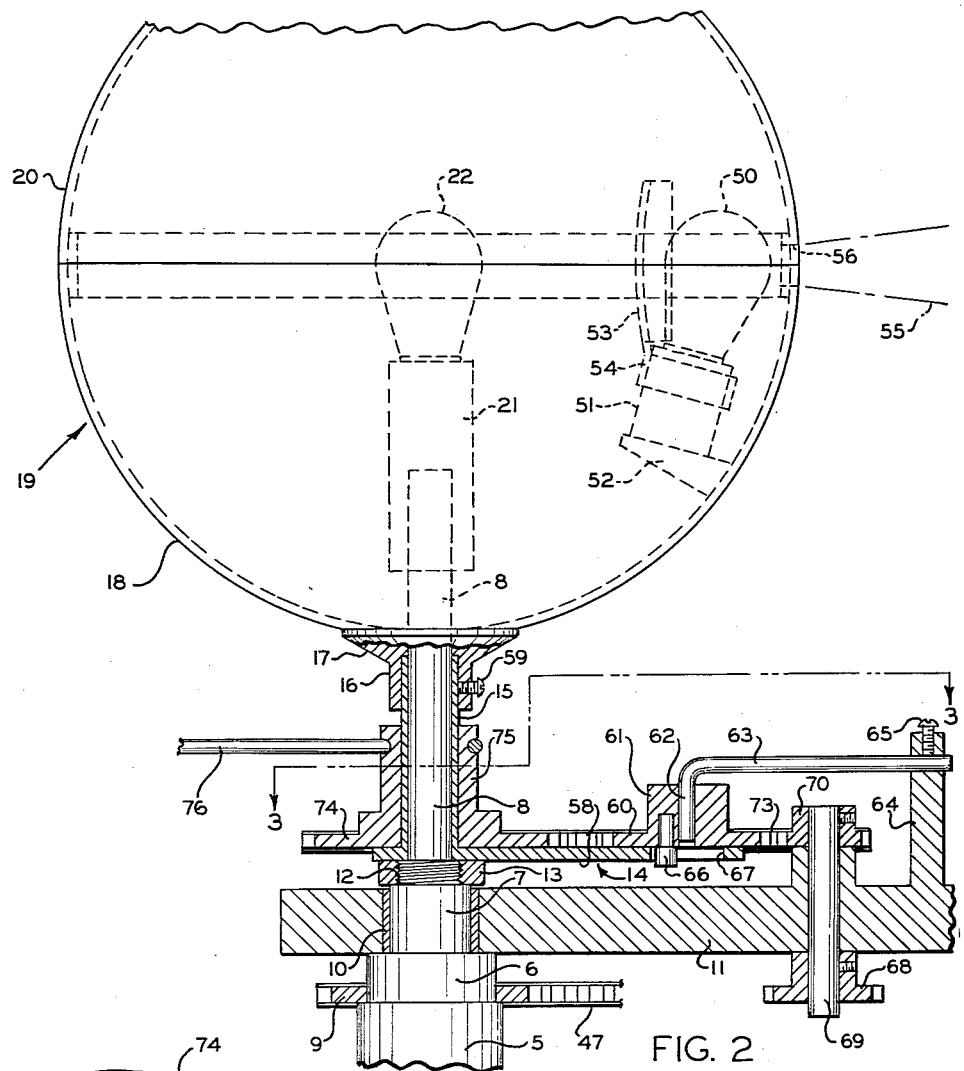
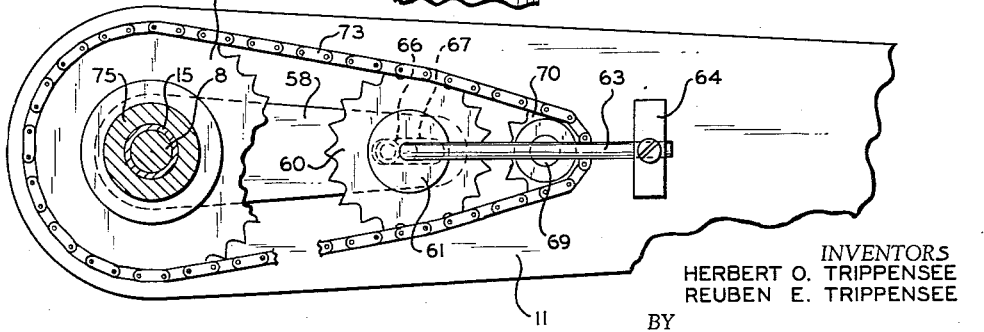

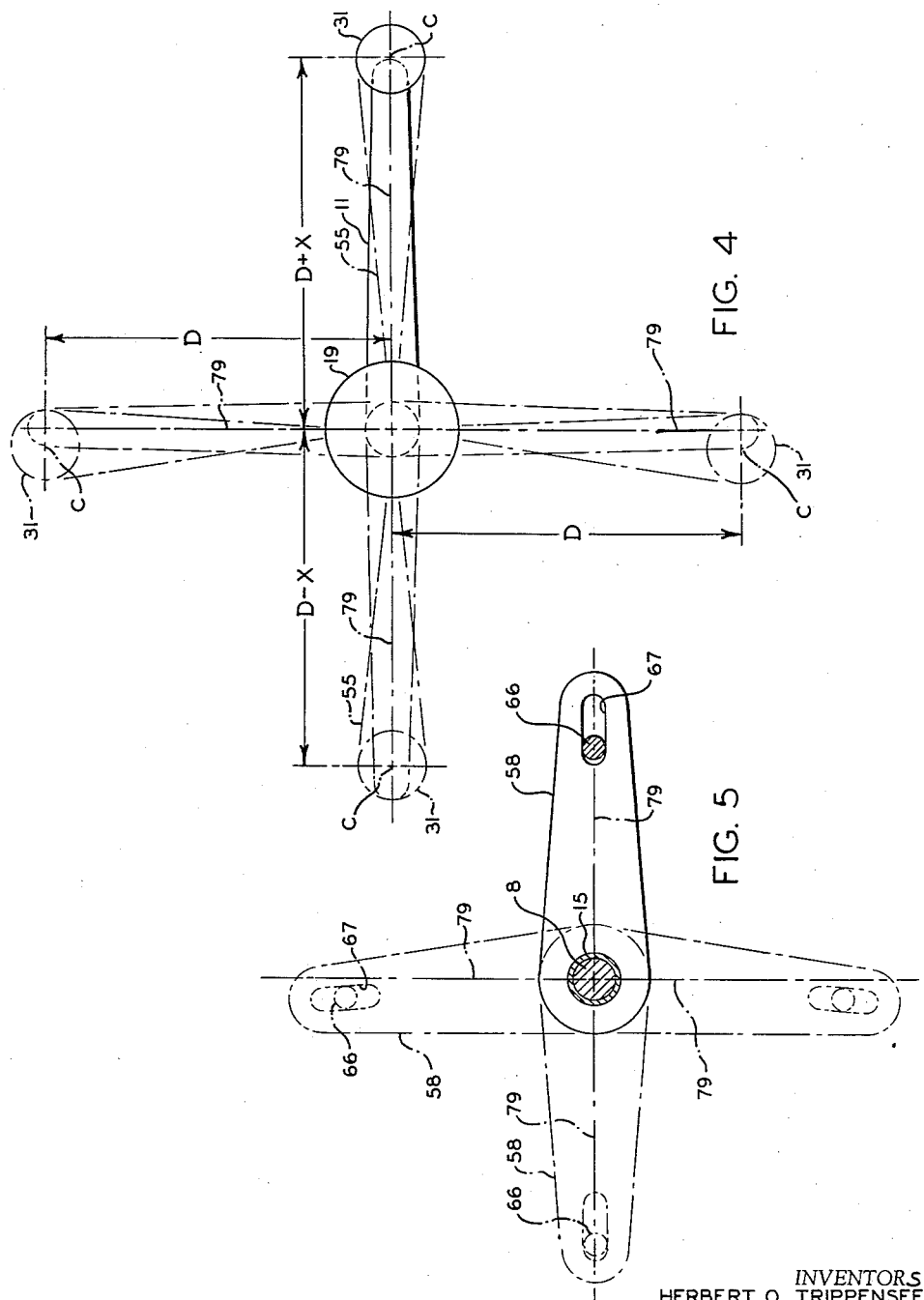

United States Patent Office 2,963,798
Patented Dec. 13, 1960

2,963,798

PLANETARIUM

Herbert O. Trippensee, Saginaw, and Reuben E. Trippensee, Amherst, Mich., assignors to Trippensee Planetarium Company, Saginaw, Mich., a partnership Filed May 22, 1958, Ser. No. 737,020

9 Claims. (Cl. 35—45)

This invention relates to planetariums of the kind adapted to illustrate in a general way the movements and effects of movements of the earth and other heavenly bodies about the sun. More particularly, the invention pertains to a planetarium capable of demonstrating, inter alia, the causes of the earth's seasons, night and day, and the reasons for the apparent rising and setting of the sun.

Planetariums intended for classroom or the like study and demonstrations obviously cannot be constructed exactly to scale, but it is important that the planetariums be so constructed that they duplicate as much as possible the movements and the effects thereof of heavenly bodies about the sun. Considering only the sun, the earth, and the moon, for example, the earth's distance from the sun varies at different points in its orbit and the distance from the earth to the moon varies at different points in the moon's orbit about the earth. In order to demonstrate these phenomena with a planetarium, the earth globe must be mounted for movement in an orbital path about the sun globe and the moon globe must be mounted for orbital movement about the earth globe.

In apparatus constructed in accordance with the invention, the varying distances of the earth globe from the sun globe are effected by mounting the earth globe in such manner that it is caused to rotate on its axis and to move in a circular path about its mounting axis as the earth globe is rotated about the sun globe. The moon's apogee, perigee, and nodes are illustrated by mounting the moon globe on a fixed length support for rotation about the earth globe, the inclination of the earth globe's spindle and its movement in a circular path about its mounting axis causing relative movement of the earth globe and the sun globe towards and away from one another as the earth globe is moved through its orbit around the sun.

To provide a realistic illustration of night and day, sunrise and sunset on the earth, it is necessary that a beam of light be aimed from the sun globe towards the earth globe. The angle of divergence of the light beam preferably should be such that, at the points where the beam falls on the earth globe, the cross-sectional area of the beam is substantially equal to the diameter of the earth. To provide a light beam of this kind, it is necessary that the beam follow the movement of the earth globe in its orbit about the sun globe. Consequently, it is desirable to project the light beam through an opening in the sun globe and rotate the sun globe on its own axis in timed relation to the movement of the earth globe about the sun. For optimum results, the center of the beam of light should be aimed directly towards the center of the earth globe so that the one half of the earth globe's surface facing the sun globe always will be illuminated evenly. This result may be attained only if the center of the beam of light is substantially perpendicular to the earth globe at all times.

As has been pointed out previously, the changes in the distance of the earth globe from the sun globe may be effected by mounting the earth globe to move in a circular path about its own axis of rotation as the earth globe is rotated about the sun globe. In such an arrangement there would be only two points in the movement of the earth globe about its own axis where the center of the light beam would be perpendicular to the earth globe if the speed of rotation of the sun globe corresponded exactly to the speed of rotation of the earth globe about the sun globe. One of these two points would be perihelion and the other would be aphelion. During the movement of the earth globe from and to these two points, however, the center of the beam of light would not be perpendicular to the surface of the earth globe because of the circular path of the earth globe about its own axis and, consequently, there is a possibility that the illumination of the earth by the sun would be illustrated inaccurately.

An object of this invention is to provide a planetarium capable of representing in a general way the relative positions of heavenly bodies such as the sun and the earth day by day, and for illustrating with accuracy the phenomena of day and night, sunrise and sunset.

Another object of the invention is to provide a planetarium including an earth globe rotatable in an orbital path about a sun globe to positions of perihelion and alphelion, the planetarium including apparatus for illuminating fully the half of the earth globe facing the sun globe in all positions of the earth globe.

A further object of the invention is to provide a planetarium of the kind referred to in which the sun globe is provided with means for aiming a beam of light directly towards the earth globe and in which the sun globe is rotatable in timed relation to the orbit of the earth globe about the sun globe so that the beam of light is constantly aimed directly towards the earth globe in all relative positions of the globes.

Other objects and advantages of the invention will be pointed out specifically or will become apparent from the following description when it is considered in conjunction with the appended claims and the accompanying drawings, in which:

Figure 2 is an enlarged view, partly in side elevation and partly in section, of a portion of the apparatus;

Figure 3 is a sectional view taken on the line 3—3 of Figure 2;

Figure 4 is a diagrammatic plan view of the apparatus and illustrating the relative positions of the sun and earth globes as the earth globe is rotated about the sun globe; and Figure 5 is a diagrammatic plan view of a portion of the structure shown in Figure 3 and illustrating its relative positions during rotation of the earth globe about the sun globe.

Figure 1:
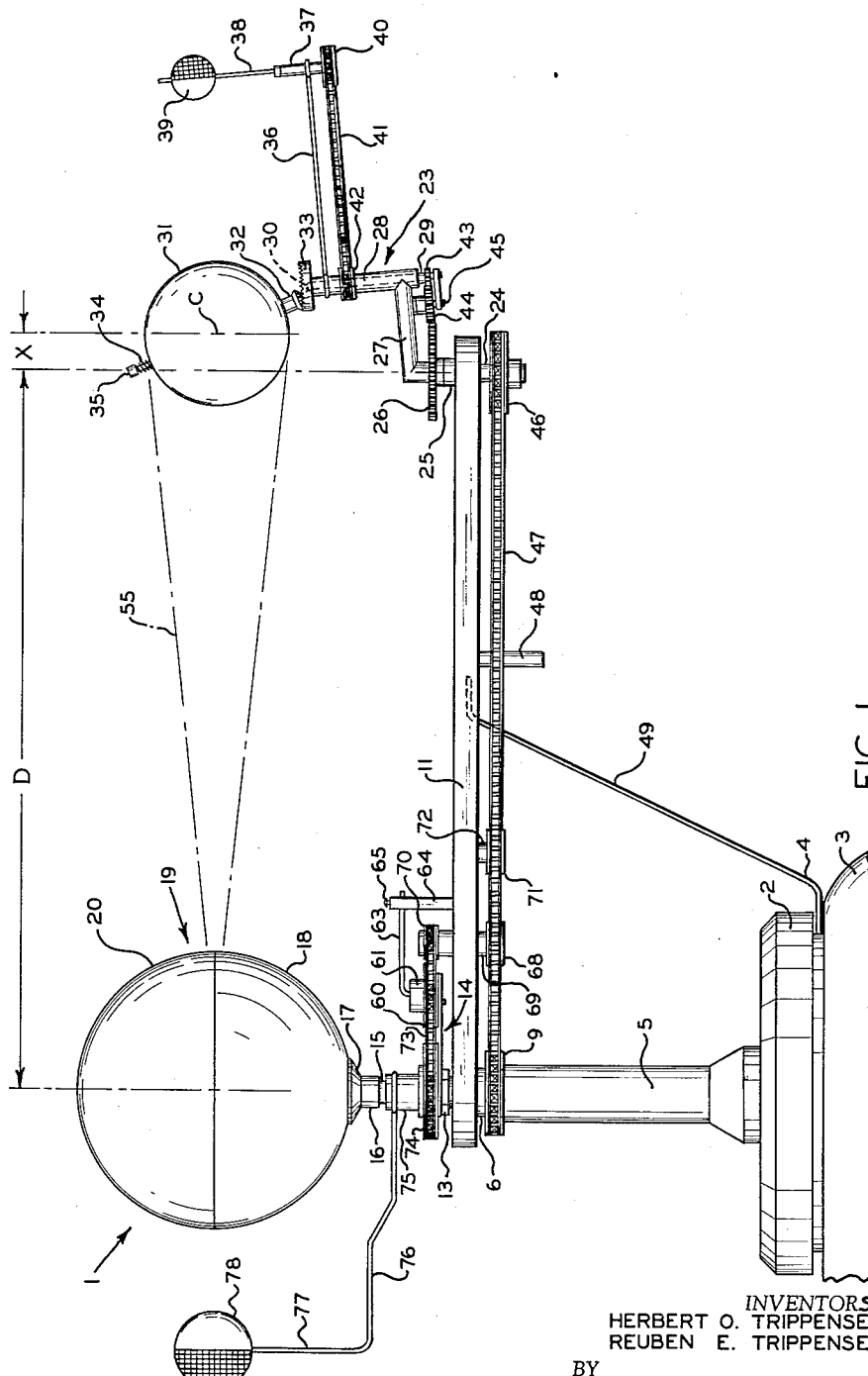
Figure 1 is a side elevational view of a planetarium constructed in accordance with the invention.

Planetariums of the general class to which the invention relates are well known and are disclosed in Patents Nos. 881,875 and 937,892, granted March 10, 1908, and October 26, 1909, respectively. Planetariums constructed in accordance with the invention are generally similar in structure to the planetariums disclosed in these prior patents, but include additional improvements and structure for attaining the above identified objects of the invention.

Referring to Figure 1, a planetarium designated generally by the numeral 1 includes a base 2 which may be mounted directly on a table top or the like or, if desired, may be mounted on the top of a housing 3 within which is located an electric motor (not shown) drivingly connected to a sweep arm 4 for rotating the latter for a purpose presently to be explained. Extending vertically upwardly from the base 2 is a standard 5 having a number of progressively reduced diameter portions 6, 7 and 8 (see Figure 2) adjacent to its upper end. On the reduced portion 6 is keyed or otherwise suitably fixed a stationary sprocket gear 9. Journalled for rotation on the reduced portion 7 by means of suitable bearings 10 is a substantially horizontal supporting arm 11. Between the reduced portions 7 and 8, the standard 5 is threaded as at 12 to receive a spacer 13 on which is supported an arm or lever device 14 including a tubular sleeve 15 which rotatably receives the reduced end portion 8 of the standard 5. Telescoped over the tubular element 15 is a socket member 16 having a cup-shaped portion 17 to which is secured in any suitable manner the lower half 18 of a hollow globe 19 which hereinafter will be referred to as the sun globe. On the lower half of the sun globe is removably supported in any convenient manner an upper half 20, the two halves 18 and 20 forming a hollow sphere when assembled.

At the upper end of the reduced portion 8 of the standard 5 and within the sun globe 19 is mounted a socket unit 21 in which an electric light bulb 22 is received. Although not shown in the drawings, the standard 5 may be bored longitudinally to permit the passage of wires by means of which electric current is supplied to the bulb 22.

Referring again to Figure 1, the supporting arm 11 extends a substantial distance from the standard 5 and is provided at its remote end with an angular standard 23 having a lower vertical portion 24 rotatably journalled in a bushing 25 which is non-rotatably mounted in an opening in the arm 11, the bushing at its upper end having a spur gear 26 formed integrally therewith. The distance from the longitudinal axis of the standard 5 to the axis of rotation of the standard 23 is represented in Figure 1 by the letter D. The standard 23 includes an intermediate portion 27 which is inclined at about 5° to the horizontal and to which is integrally connected a substantially right angular portion 28 which is internally bored so as rotatably to accommodate a spindle 29 having a bent portion 30 intermediate its ends so that its upper end is inclined to the vertical at an angle of about 23½°. Mounted on the upper end of the spindle 29 is a sphere 31 representing an earth globe. At the point corresponding to the south pole of the earth globe 31 is fixed a bevel gear 32 which meshes with gear teeth formed on a ring-like gear element 33 which is rotatably mounted on the portion 28 of the standard 23. The gear 32 normally is urged into meshing engagement with the the teeth of the gear element 33 by means of a spring 34 surrounding the spindle 29 and reacting between a cap 35 at its upper end and the surface of the earth globe 31. The geometric center of the earth globe is represented in Figure 1 by the letter C and the distance or radius of the point C from the axis of rotation of the standard 23 is represented by the letter X.

A supporting arm 36 has one of its ends secured to the hub of the gear element 33 and has its other end secured to a bushing 37 in which is rotatably mounted a spindle 38, the upper end of the latter having secured thereto a small sphere 39 representing the earth's moon. The lower end of the spindle 38 has fixed thereto a sprocket wheel 40 around which is trained a sprocket chain 41. The chain 41 also is trained around a sprocket gear 42 which is mounted fast on the portion 28 of the standard 23.

The lower end of the earth globe's mounting spindle 29 is provided with a gear 43 which meshes with an idler gear 44 mounted on a stub shaft 45 fixed to the transverse portion 27 of the standard 23, the idler gear 44 being in mesh with the gear 26 mounted on the bushing 25.

The arrangement of the earth globe, the moon globe, their supporting elements, and their operating means is generally similar to the arrangement of the corresponding elements disclosed in Patent No. 937,892, and, as such, constitutes no part of this invention per se. The important characteristic of the earth and moon elements thus far described is that they are so arranged that rotation of the standard 23 about the axis of its vertical portion 24 will cause the earth globe 31 to move in a circular path, having a radius X, about the axis of the standard portion 24 and will cause corresponding rotation of the moon globe 39 about the axis of its spindle 38. The diameters of the sprocket gears 40 and 42 are so selected that one face of the moon globe 39 always will face away from the sun globe 19 and this face may be blackened as is indicated in Figure 1.

The rotation of the moon globe about the axis of the arm portion 28, coupled with the rotation of the earth globe about the axis of the standard portion 24 will, as is described in the aforementioned patents, position the moon globe in apogee and in perigee. As illustrated in Figure 1, the moon globe is in apogee.

Means for effecting rotation of the earth globe and the moon globe comprises a sprocket wheel 46 fixed on the lower end of the shaft portion 24 and around which is trained a sprocket chain 47, the chain 47 also being trained around the fixed sprocket gear 9 mounted on the standard 5. The arrangement of the gears 9 and 46 with the chain 47 is similar to the arrangement shown in the above identified patents in the sense that rotation of the arm 11 about the axis of the standard 5 will cause rotation of the standard 23 and, consequently, rotation of the earth globe 31 about the axis of the spindle 29 and also movement of the earth globe 31 in a circular path about the axis of the shaft portion 24, as well as rotation of the moon globe 39 about the earth globe 31 as has previously been indicated. To facilitate rotation of the arm 11, the latter may have secured to its lower surface a post 48 which may be grasped by hand or, alternatively, the arm 11 may receive the upper end of a drive transmitting lever 49 driven in a circular path by the electric motor located in the housing 3.

Means is provided for aiming or directing a beam of light from the sun globe 19 towards the earth globe 31 and conveniently may comprise an electric light bulb 50 (see Figure 2) mounted in a socket 51 supported on a bracket 52 fixed to the inner wall of the lower half 18 of the sun globe 19. A reflector 53 of suitable shape may be mounted on the socket 51 by means of a friction ring 54 so as to direct a beam of light indicated by the reference character 55 through an opening 56 in the sun globe 19. Suitable current conducting wires (not shown) may lead from the socket 51 to the socket 21 so as to connect the bulb 50 in parallel with the bulb 22. If desired, the bulb 50 may be shielded on all sides except where the opening 56 is located so as to prevent the creation of a bright spot on the surface of the sun globe.

The reflector preferably is so shaped that the divergence of the light beam 55 is such that the cross sectional area of the beam is about as great as the diameter of the earth globe. In such an arrangement, it is necessary that the center of the light beam be substantially perpendicular to the surface of the earth globe in order that the latter properly may be illuminated.

In order that the beam of light may fall upon the earth globe throughout the orbit of the latter about the sun globe, means is provided for interconnecting the sun globe and the earth globe for rotation of the sun globe about its own axis in response to movement of the earth globe in its orbit. The interconnecting means comprises, in part, the lever device 14, previously referred to, and which includes a laterally extending lever arm or portion 58 which is generally parallel to the supporting arm 11. As has been pointed out hereinbefore, the lever device 14 includes an integral sleeve 15 which is rotatable relative to the standard 5 and which is received in the hub 16 of the sun globe mounting socket 17. The socket 17 is made fast with the sleeve 15 by a plurality of set screws, one of which is shown at 59 in Figure 2, the arrangement being such that rotation of the lever device 14 causes rotation of the sun globe 19 about its own vertical axis.

Inasmuch as the earth globe 31 moves in a circular path about the axis of the portion 24 of the standard 23 during orbital movement of the earth globe about the sun globe, the sun globe must be capable of rotation relative to the supporting arm 11 if the light beam 55 always is to be aimed towards the earth globe 31 in such manner that the center of the light beam 55 constantly will be perpendicular to the earth globe. Stated differently, the speed of rotation of the sun globe must differ from the speed of rotation of the earth globe in its orbit around the sun globe during portions of the latter.

Means for regulating the speed of rotation of the sun globe comprises a gear element 60 which rests on the outer end of the lever arm 58, the gear element 60 having a hub portion 61 which is bored to receive rotatably one end 62 of a holding arm 63 mounted for adjustment in a bracket 64 which may be fixed on the supporting arm 11. The holding arm 63 may be fixed in adjusted position by means of a set screw 65. The gear element 60 carries an eccentrically located post 66 which extends through an opening 67 adjacent to the outer end of the lever arm 58. The arrangement of the speed regulating parts thus far described is such that rotation of the gear element 60 and consequent rotation of the eccentric post 66 will cause oscillating movement of the lever arm 58 and corresponding rocking movement of the sun globe 19. It should be noted that the gear element 60, the eccentric post 66, the arm 63 and the bracket 64 also compel the lever device 14 to move with the supporting arm 11, so these elements properly may be considered as forming part of the means for rotating the sun globe in response to rotation of the earth globe.

Means for rotating the gear element 60 includes a spocket wheel 68 mounted fast on a vertical shaft 69 journalled for rotation in the supporting arm 11 and having fixed at its upper end a sprocket wheel 70. The shaft 69 is so mounted on the arm 11 that the sprocket wheel 68 engages the drive chain 47 and is rotated thereby. If desired, the apparatus may include a sprocket wheel 71 (see Figure 1) journalled on a stub shaft 72 which is mounted on the arm 11 in such position as to enable the wheel 71 to guide and tension the chain 47.

Around the sprocket wheel 70 is trained a sprocket chain 73 which also engages opposed sides of the gear element 60 (see particularly Figure 3), the chain 73 also being trained around a sprocket wheel 74 which is journalled for rotation relative to the sleeve 15. If desired, the sprocket gear 74 may include an enlarged hub 75 on which is fixed a supporting arm 76 having mounted at its other end a spindle or support 77 on which a small sphere 78 representing Venus may be fixed so as to rotate with the sprocket wheel 74 and describe an orbit around the sun globe 19. One half of the sphere 78 always will be in darkness and may be blackened as is indicated in Figure 1.

When the apparatus is assembled and the parts are arranged as shown in Figure 1, the earth globe 31 is in aphelion and indicates summertime in the northern hemisphere due to the inclination of the earth's spindle 29. These are the positions of the parts shown in full lines in Figures 4 and 5 and in these positions the center of the beam of light 55 is parallel with the longitudinal axis 79 of the supporting arm 11, whereby the center of the light beam 55 is perpendicular to the surface of the earth globe 31. In Figure 4, the distance from the axis of the sun globe 19 to the axis of rotation of the shaft portion 24 of the earth globe supporting standard 23 again is represented by the letter D and the radius of the circle through which the earth globe moves as the standard 23 is rotated again is represented by the letter X. Accordingly, when the earth globe is in aphelion, distance of its center C from the axis of the sun globe 19 is $D+X$.

As the supporting arm 11 is rotated 180° from the position shown in full lines in Figure 4, the earth globe supporting standard 23 will be rotated through 180° so as to locate the earth globe in perihelion, that is, closer to the sun, but due to the inclination of the earth's axis it will indicate wintertime in the northern hemisphere and summertime in the southern hemisphere. Also, the sun globe will have been rotated 180° with the supporting arm 11 so that when the earth globe is in perihelion the center of the light beam 55 once again is parallel with the longitudinal axis 79 of the arm 11 and the center of the light beam is perpendicular to the surface of the earth globe. During movements of the earth globe to and from its positions of aphelion and perihelion, the center of the earth globe of the apparatus will be moved to one side or the other of the longitudinal axis 79 of the supporting arm 11 because of the rotation of the standard 23 about the axis of its portion 24. These positions also are shown in Figure 4, and for purposes of illustration, the arm 11 has been shown rotated 90° from each of the positions of perihelion and aphelion.

As will be evident from Figure 4, when the earth globe is in positions intermediate its positions of aphelion and perihelion, the geometric center C of the earth globe is located at one side or the other of the longitudinal axis 79 of the supporting arm 11. Consequently, if the center of the light beam 55 remained parallel with the longitudinal axis of the arm 11, the center of the light beam would not be perpendicular to the surface of the earth globe at these positions. In apparatus constructed according to the invention, however, as the arm 11 is swung through 90° from either of its positions of aphelion or perihelion the gear element 60 and its eccentric post 66 also are rotated through 90° so that the latter bears against one of the side walls of the slot 67 in the lever arm 58 and causes rotation of the lever arm 58 relative to the arm 11 an amount sufficient to maintain the center of the light beam 55 perpendicular to the surface of the earth globe. When the arm 11 has been rotated through 180°, the gear element 60 and the eccentric post 66 also will have been rotated through 180°, the movement of the post 66 in the slot 67 again causing the lever arm 58 to rotate relative to the arm 11.

As will be evident from Figures 4 and 5, the construction and arrangement of the lever arm 58 and its associated parts are such that the speed of rotation of the lever arm 58 during movement of the supporting arm 11 through 90° from the aphelion position of the earth globe 31 is greater than the speed of rotation of the arm 11 so as to enable the lever arm 58 and the sun globe 19 to be rotated through more than 90°. Moreover, the construction and arrangement of the lever arm 58 and its associated parts are such that the speed of rotation of the lever arm 58 and the sun globe 19 is less than the speed of rotation of the arm 11 from its 90° positions to its perihelion position so as to enable the sun globe to be rotated through less than 90° as the arm 11 is being moved towards its perihelion position. In all positions of the parts, however, the center of the light beam 55 is maintained perpendicular to the surface of the earth globe so that the half of the earth globe towards the sun will be illuminated to represent daylight and the other half of the earth globe will be in darkness to represent night. As the supporting arm 11 is swung about the axis of the standard 5, the earth globe will be rotated on its spindle 29, as has previously been pointed out, so as to enable sunrise, sunset, daylight and darkness to be illustrated graphically. Moreover, the moon globe will be rotated about the earth globe so as to illustrate the phenomena of the moon's phases, and eclipses of the sun and moon. Many other astronomical characteristics may be illustrated by the disclosed apparatus, as is pointed out in the patents previously referred to, but need not be referred to in detail herein.

The disclosed embodiment is representative of a presently preferred form of the invention, but is intended to be illustrative rather than definitive thereof. The invention is defined in the claims.

We claim:

1. A planetarium comprising a sun globe; means mounting said sun globe for rotation about its own axis, an earth globe; means mounting said earth globe for movement in a circular path about an axis and for movement about said sun globe in an orbital path such that said earth globe is closer to said sun globe at one point in its orbit than elsewhere and is farther away from said sun globe at another point in its orbit than elsewhere; means interconnecting said earth globe and said sun globe for rotating said sun globe in response to movement of said earth globe in its orbit; a source of illumination for directing a beam of light towards said earth globe; means mounting said source of illumination for movement with said sun globe so that the center of said beam of light is substantially perpendicular to said earth globe when the latter is at either of said points; and means connected to said sun globe and operated by said interconnecting means for regulating the speed of rotation of said sun globe as said earth globe moves in its said circular path from and to said points to maintain the center of said beam of light substantially perpendicular to said earth globe.

2. A planetarium comprising a sun globe; means mounting said sun globe for rotation about its own axis; an earth globe; means mounting said earth globe for movement in a circular path about an axis and for movement about said sun globe in an orbital path such that said earth globe is closer to said sun globe at one point in its orbit than elsewhere and is farther away from said sun globe at another point in its orbit than elsewhere; means interconnecting said earth globe and said sun globe for rotating said sun globe in response to movement of said earth globe in its orbit; a source of illumination for directing a beam of light towards said earth globe; means mounting said source of illumination for movement with said sun globe so that the center of said beam of light is substantially perpendicular to said earth globe when the latter is at either of said points; and a speed regulating device connected to said sun globe and to said interconnecting means for operation by the latter to vary the speed of rotation of said sun globe as said earth globe moves in its said circular path between said points.

3. The construction set forth in claim 2 wherein the mounting means for said sun globe includes a lever rotatable with said sun globe and wherein said speed regulating device includes eccentric means connected to said lever.

4. A planetarium comprising a support; an arm mounted on said support for rotation relative thereto about an axis; a sun globe; means mounting said sun globe on said arm for rotation relative thereto about said axis; an earth globe; means mounting said earth globe on said arm for rotation with the latter about said axis and for movement relative to said arm in a circular path about an axis spaced from the axis of rotation of said arm; means interconnecting said earth globe and said sun globe for transmitting rotation of one of said globes to the other in response to rotation of said arm, the arrangement being such that movement of said earth globe in its said circular path during rotation of said arm causes said earth globe to move in an orbital path about said axis of said sun globe such that said earth globe is closer to said sun globe at one point in said orbital path than elsewhere and is farther away from said sun globe at another point in said orbital path than elsewhere; a source of illumination for directing a beam of light to- wards said sun globe; means mounting said source of illumination for movement with said sun globe so that the center of said beam of light is substantially perpendicular to said earth globe when the latter is at either of said points in its said orbital path; and means connected to said sun globe and to said interconnecting means for operation by the latter to regulate the speed of rotation of said sun globe as said earth globe moves from and to either of said points and maintain the center of said beam of light substantially perpendicular to said earth globe.

5. A planetarium comprising a support; an arm mounted on said support for rotation relative thereto about an axis; a sun globe; means mounting said sun globe on said arm for rotation relative thereto about said axis; an earth globe; means mounting said earth globe on said arm for rotation with the latter about said axis and for movement relative to said arm in a circular path about an axis spaced from the axis of rotation of said arm; means interconnecting said earth globe and said sun globe for transmitting rotation of one of said globes to the other in response to rotation of said arm, the arrangement being such that movement of said earth globe in its said circular path during rotation of said arm causes said earth globe to move in an orbital path about said axis of said sun globe such that said earth globe is closer to said sun globe at one point in said orbital path than elsewhere and is farther away from said sun globe at another point in said orbital path than elsewhere; a source of illumination for directing a beam of light towards said earth globe; means mounting said source of illumination for movement with said sun globe so that the center of said beam of light is substantially prepedicular to said earth globe when the latter is at either of said points in its said orbital path; means connected to said sun globe and to said interconnecting means for operation by the latter to regulate the speed of rotation of said sun globe as said earth globe moves from and to either of said points and maintain the center of said beam of light substantially perpendicular to said earth globe; and means connected to said arm for rotating the latter about its said axis.

6. A planetarium comprising a sun globe; means mounting said sun globe for rotation about its own axis; a supporting arm mounted for rotation about said axis; an earth globe; means mounting said earth globe on said arm for rotation therewith and for rotation about an axis spaced from the axis of said sun globe; means interconnecting said arm and said earth globe so that rotation of said arm causes rotation of said earth globe about said spaced axis, whereby said earth globe moves about said axis of said sun globe in an elliptical path; a source of illumination mounted for movement with said sun globe for directing a beam of light towards said earth globe; and means interconnecting said earth globe and said sun globe for rotating the latter about its said axis relative to the rotation of said arm so as to maintain said beam of light directed towards said earth globe in all positions of the latter along said path.

7. A planetarium comprising a sun globe; a supporting arm; means mounting said sun globe and said arm for rotation about a common axis; an earth globe; means mounting said earth globe for movement about said axis and for rotation in a circular path about an axis spaced from said common axis; a source of illumination mounted for rotation with said sun globe and including means for aiming a beam of light towards said earth globe; means interconnecting said sun globe and said supporting arm for imparting rotation to the said sun globe in response to rotation of said supporting arm about said common axis; means reacting between said earth globe and its said mounting means for rotating said earth globe in said circular path about said spaced axis in response to rotation of said supporting arm about said common axis; and means connected to said sun globe and reacting with said interconnecting means for rotating said sun globe relative to said supporting arm in timed relation to the rotation of said earth globe about said circular path so as to enable said beam of light to follow said earth globe in all positions of the latter in said circular path.

8. A planetarium comprising a standard; a supporting arm mounted for rotation about the axis of said standard; an earth globe; means mounting said earth globe on said arm for rotation with the latter and for movement relative thereto in a circular path about an axis spaced from the first mentioned axis; drive means interconnecting said standard and said earth globe for moving the latter in said circular path in response to rotation of said arm; a sun globe; means mounting said sun globe on said standard for rotation about said first mentioned axis; a source of illumination for directing a beam of light towards said earth globe; means mounting said source of illumination for movement with said sun globe; means interconnecting said arm and said sun globe for rotating the latter in response to rotation of said arm; and speed regulating means connected to said sun globe and operated by said drive means for varying the speed of rotation of said sun globe in timed relation to the movement of said earth globe in said circular path so as to direct said beam of light towards said earth globe in all positions of the latter.

9. The construction set forth in claim 8 wherein said speed regulating means includes a lever arm and an eccentric connected to said lever arm.

References Cited in the file of this patent

UNITED STATES PATENTS

| | | |
|---|---|---|
| 491,017 | Huntman | Jan. 31, 1893 |
| 756,345 | Epes | Apr. 5, 1904 |
| 881,875 | Trippensee | Mar. 10, 1908 |
| 1,050,044 | Sheldon | Jan. 7, 1913 |
| 2,098,296 | La Grasse | Nov. 9, 1937 |
| 2,287,594 | Barbagelata | June 23, 1942 |

FOREIGN PATENTS

| | | |
|---|---|---|
| 425,108 | Great Britain | Mar. 4, 1935 |
| 480,689 | Italy | May 9, 1953 |

UNITED STATES PATENT OFFICE
CERTIFICATION OF CORRECTION

Patent No. 2,963,798            December 13, 1960

Herbert O. Trippensee et al.

It is hereby certified that error appears in the above numbered patent requiring correction and that the said Letters Patent should read as corrected below.

In the grant, lines 1 and 2, for "Herbert O. Trippensee, of Saginaw, and Reuben E. Trippensee, of Amherst, Michigan," read -- Herbert O. Trippensee, of Saginaw, Michigan, and Reuben E. Trippensee, of Amherst, Massachusetts, --; in the heading to the printed specification, lines 3 and 4, for "Herbert O. Trippensee, Saginaw, and Reuben E. Trippensee, Amherst, Mich.," read -- Herbert O. Trippensee, Saginaw, Mich., and Reuben E. Trippensee, Amherst, Mass., --.

Signed and sealed this 9th day of May 1961.

(SEAL)

Attest:

ERNEST W. SWIDER             DAVID L. LADD
Attesting Officer             Commissioner of Patents